US007558682B2

(12) United States Patent
Yamamoto

(10) Patent No.: US 7,558,682 B2
(45) Date of Patent: Jul. 7, 2009

(54) CHROMATOGRAPH MASS SPECTROMETER

(75) Inventor: Yoshitake Yamamoto, Kyoto (JP)

(73) Assignee: Shimadzu Corporation, Kyoto-fu (JP)

( * ) Notice: Subject to any disclaimer, the term of this patent is extended or adjusted under 35 U.S.C. 154(b) by 279 days.

(21) Appl. No.: 11/790,355

(22) Filed: Apr. 25, 2007

(65) Prior Publication Data

US 2007/0284520 A1 Dec. 13, 2007

(30) Foreign Application Priority Data

May 16, 2006 (JP) ............................ 2006-136100

(51) Int. Cl.
*G06F 19/00* (2006.01)

(52) U.S. Cl. ....................................................... 702/23

(58) Field of Classification Search ................... 702/19, 702/23, 27; 382/128; 250/281, 282
See application file for complete search history.

(56) References Cited

U.S. PATENT DOCUMENTS 6,498,340 B2 12/2002 Anderson et al.
7,009,174 B2 3/2006 Le Blanc
2007/0211928 A1 * 9/2007 Weng et al. ................ 382/128

FOREIGN PATENT DOCUMENTS

JP 2005-141845 A 6/2005

* cited by examiner

*Primary Examiner*—Kiet T Nguyen
(74) *Attorney, Agent, or Firm*—Sughrue Mion, PLLC

(57) ABSTRACT

An exact centroid spectrum with a mass number corrected is determined from a profile spectrum adjacent to a plurality of peaks. Regarding a profile spectrum determined by a mass spectrometer, overlapping with adjacent peaks occurs, and compounds having a plurality of peaks with different overlapping degrees is measured, a correction function is created from a relationship between an overlapping degrees with respect to the plurality of peaks and a shift of the mass number, and a centroid peak is corrected by the correction function when the profile spectrum is converted into the centroid spectrum.

2 Claims, 10 Drawing Sheets

CHROMATOGRAPH MASS SPECTROMETER

BACKGROUND OF THE INVENTION

1. Field of the Invention

The present invention relates to a chromatograph mass spectrometer, and more specifically, to correction processing of a centroid spectrum.

2. Description of the Related Art

A mass spectrometer (MS) is often used in combination with a liquid chromatograph or a gas chromatograph (GC). A liquid chromatograph mass spectrometer (LC/MS) uses a mass spectrometer as a detector of a liquid chromatograph. The liquid chromatograph mass spectrometer introduces the mixture containing a plurality of chemical compounds to a liquid chromatograph, separates each chemical compound in a time direction by a column, introduces the component eluted from the column to a mass spectrometer via an interface portion to ionize the chemical compound, and thereafter, separates the ions on the mass number basis to detect the separated ions.

In a case of the measurement of a spectrum by an ion trap time-of-flight mass spectrometer in which the LC is combined with an ion trap mass spectrometer (IT) and a time-of-flight mass spectrometer (TOF), when ions accumulated in an ion trap are discharged to a TOF portion at a certain timing, the ions reach a detector in an increasing order of a mass number (m/z) of the ions, and are detected as signals. Thus, a period from a time when the ions are discharged from the ion trap to a time when the ions reach the detector is measured, and the intensity at which the ions reach the detector during that period is measured. As a result, the intensity of the detector signal of the ions with respect to the mass number thereof can be measured as an MS profile spectrum as shown in FIG. 3.

Regarding the spectrum information by the mass spectrometer, as shown in FIG. 5, there are a case where an MS profile spectrum (broken line portion) is displayed as it is, and a case where the mass number of the each peak in the measured MS profile spectrum is determined, and an MS centroid spectrum (vertical bar portion) converted into the representative mass number of the each peak and the intensity thereof is displayed. The mass number in a case of being converted into an MS centroid spectrum is shown at a gravity position in the peak, and the intensity is shown as an area value of the peak.

Generally, the LC/MS uses an ionization method (Electrospray "ESI") in which an ionization procedure is soft, and atmospheric pressure chemical ionization (APCI), or the like. Therefore, unlike the case of an electron impact "EI" in the GC/MS, a simple mass-spectrum is determined, in which only ions such as $[M+H]^+$ or $[M+Na]^+$ with protons or a salt in a solvent added to a component are measured during positive ion measurement, and ions such as $[M-H]^-$ dehydrogenated from components are measured during negative ion measurement. Further, in a case of the ESI method, a spectrum of polyvalent ions ($n \geqq 2$) such as $[M+nH]^{n+}$ or $[M+nNa]^{n+}$ with a plurality of protons or a salt in a solvent added to a component, depending upon the sample, is measured.

In a case of measuring a spectrum in an ionization mode in which only monovalent ions are generated as in an APCI mode, the peak of a spectrum of a component eluted from a column is detected at a position of a mass number away from a monoisotropic peak by the difference in an isotope mass number of constitutional elements of the component. Samples of a hydrocarbon type are often measured by a mass spectrometer. In a case of such samples, as shown in FIG. 4A, ions with one hydrogen atom being composed of an isotope 2H is observed at the mass number away from the monoisotopic peak by 1 m/z, and ions with two hydrogen atoms being composed of an isotope 2H are observed at the mass number away from the monoisotropic peak by 2 m/z. Thus, isotope peaks are observed at a distance of about 1 m/z. In a case where polyvalent ions are generated as in the ESI mode, the mass difference from the isotope peak varies depending upon an atomic value of the ions. As shown in FIG. 4B, in a case of divalent ions, an isotope peak is observed at a mass difference of about 0.5 m/z from an isotope peak and in a case of trivalent ions, an isotope peak is observed at a mass difference of about 0.333 m/z.

MS/MS measurement is also conducted in which the peak of a particular ion is selected from the ion peaks of a spectrum determined by the MS measurement, and the second measurement is conducted with the selected particular ion being a precursor ion. In a case of qualitative analysis carrying out a structural analysis of a component by MS/MS measurement, the mass number of a component separated from a column is often unclear. Thus, an MS/MS spectrum is measured using a procedure called Data Dependent Acquisition "DDA" in which a peak matched with a precursor ion selection condition for MS/MS measurement specified by a user is searched for from a plurality of the peaks in a spectrum at a time when a peak other than those of a medium is detected in an MS spectrum, and MS/MS spectrum measurement of the peak is carried out. As a result, information for a structural analysis by the user is provided. As also described in Patent Documents, for example, U.S. Pat. No. 6,498,340 and U.S. Pat. No. 7,009,174, the DDA is effective for the MS/MS measurement used for analyzing a compound with a complicated structure.

In the DDA, it is necessary to set measurement conditions for the user to carry out the MS/MS measurement. Examples of the typical conditions include (i) timing for starting a search for a precursor ion (a intensity threshold value of a spectrum), (ii) a search mass range of a precursor ion, and (iii) an ionic charge number of a precursor ion. When such measurement conditions are set, and a sample is injected, measurement is started. Regarding a component eluted from a column, an MS spectrum is measured by a mass spectrometer. In a case where a precursor ion matched with the measurement conditions of the DDA is searched for and found, using the MS spectrum data, the measurement of an MS/MS spectrum of a precursor ion is conducted.

When a precursor ion matched with the measurement conditions of the DDA is searched for, it is necessary that the ionic charge number of the each peak in an MS spectrum is matched with the ionic charge number specified under the selected conditions. As a procedure for calculating the ionic charge number of the each peak, various procedures have been studied. However, a procedure for carrying out charge number determination processing at a high speed, such as a search for a precursor ion mass number for conducting subsequent measurement during measurement as in a case of conducting the DDA, is limited. As one procedure, there is procedure for estimating the charge number from the difference in a mass number between adjacent peaks, using a centroid spectrum. According to this procedure, in a mass spectrometer capable of measuring the mass number precisely such as a time-of-flight mass spectrometer, an ionic charge number of a peak is estimated from the mass difference between the respective peaks in the measured/converted MS centroid spectrum.

As a peak interval becomes narrower as the charge number increases. Therefore, an overlapping effect with the adjacent peaks in a profile spectrum generating a centroid spectrum occurs. In a profile spectrum, in a case where the spectrum and the peaks before and after the spectrum are completely separated, there is no problem. However, in a case where a charge number increases, and rising or falling of the peaks before and after the spectrum is overlapped with another peak, as shown in FIG. 6A, a peak position (2) expressed by a centroid shifts from a true peak position (1). A centroid position shifts due to the overlapping of the peaks. Therefore, in a case of estimating the charge number from an interval with respect to adjacent peaks in the charge number estimation processing in the DDA, the influence of this shift becomes negligible as the charge number increases. For example, in a case where the charge number is 10, a distance with respect to the adjacent peaks is 0.100 m/z; however, in a case where the charge number is 11, the distance with respect to the adjacent peaks is 0.091 m/z. Therefore, when the peak with a charge number of 10 shifts by 0.005 m/z due to the overlapping of the peaks, the interval between the peaks becomes 0.09 m/z, so there is a possibility that the charge number may be estimated to be 11 in estimation processing. Regarding the overlapping peaks, the profile spectrum (solid line) in FIG. 6A is separated into two peak data represented by dotted lines, using a procedure called "waveform separation", and thereafter, is converted into a centroid using information on each peak data. However, this procedure takes a time for processing since waveform separation processing is performed by differential processing (generally, tertiary differentiation) of a waveform, so this procedure cannot be conducted during the measurement processing.

SUMMARY OF THE INVENTION

The present invention has been made in view of the above-mentioned problems, and an object of the present invention is to provide a mass spectrometer capable of searching for a precursor ion exactly under specified measurement conditions, in a case where analysis is conducted while a precursor ion is being changed when MS/MS measurement is conducted under analysis conditions such as DDA in mass analysis.

The present invention has been achieved in view of the above-mentioned problems. That is, the present invention provides a chromatograph mass spectrometer, including: analysis execution means for obtaining a profile spectrum in a mass range based on a setting condition by one mass scanning; conversion means for converting the profile spectrum into a centroid spectrum; precursor ion selection means for setting an ion of a peak of the centroid spectrum matched with the setting condition to be a precursor ion; means for, in a mass spectrometer that performs mass scanning by the analysis execution means regarding the precursor ion, measuring a known calibrate sample in which overlapping between a compound with a known mass number and an adjacent peak occurs and which has a plurality of peaks having different overlapping degrees, and creating a correction function from a relationship between an overlapping degree with respect to the plurality of peaks and a shift of the mass number; and correction means for correcting the centroid peak with the correction function when the profile spectrum is converted into the centroid spectrum.

According to the present invention, a calibrate sample with its properties being known is measured. As a result, a function is created, which corrects a shift of a mass number generated due to the overlapping of the peaks when an intended sample is measured. The shift generated due to the overlapping of the peaks measured for the intended compound is corrected. As a result, a true value of the mass number is calculated.

According to another aspect of the present invention, there is provided a chromatograph mass analysis method, including: executing analysis of obtaining a profile spectrum in a mass range based on a setting condition by one mass scanning; converting the profile spectrum into a centroid spectrum; selecting an ion of a peak of the centroid spectrum matched with the setting condition as a precursor ion; and performing mass scanning with the analysis execution means regarding the precursor ion, in which a known calibrate sample in which overlapping between a compound with a known mass number and an adjacent peak occurs and which has a plurality of peaks having different overlapping degrees, a correction function is created from a relationship between an overlapping degree with respect to the plurality of peaks and a shift of a mass number, and the centroid peak is corrected with the correction function when the profile spectrum is converted into the centroid spectrum.

According to the present invention, a calibrate sample with its properties known is measured. As a result, a function is created, which corrects a shift of a mass number generated due to the overlapping of peaks when an intended sample is measured. The shift generated due to the overlapping of the peaks measured for the intended compound is corrected. As a result, a true value of the mass number is calculated. A charge number is determined using the corrected mass number, so an error in determination of a charge number caused by the shift of a mass number due to the overlapping of peaks decreases, and the measurement precision by MS/MS measurement is enhanced.

According to the present invention, the precision of a mass number determined when an MS profile spectrum is converted into a centroid spectrum can be enhanced. Further, when MS/MS spectrum measurement of a precursor ion matched with the conditions specified by a user is conducted as in DDA, the shift of a mass number of the centroid spectrum due to the overlapping of the profile spectrum is corrected, so it is possible to determine an ionic charge number of the each peak exactly even in charge number determination processing of ions. Since MS/MS measurement is conducted with an ion of a true mass number with a shift corrected being a precursor ion, more exact analysis results can be obtained for an intended compound.

DETAILED DESCRIPTION OF THE EXEMPLARY EMBODIMENTS

Figure 1:
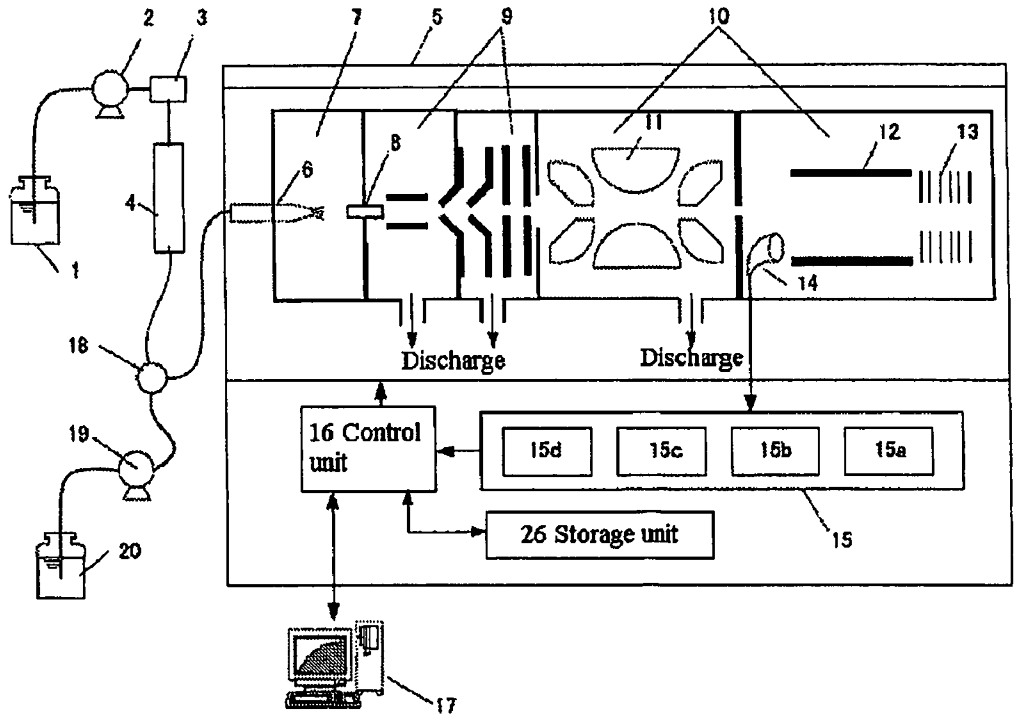
FIG. 1 is a structural diagram of a liquid chromatograph mass spectrometer using an HPLC.
Figure 2:
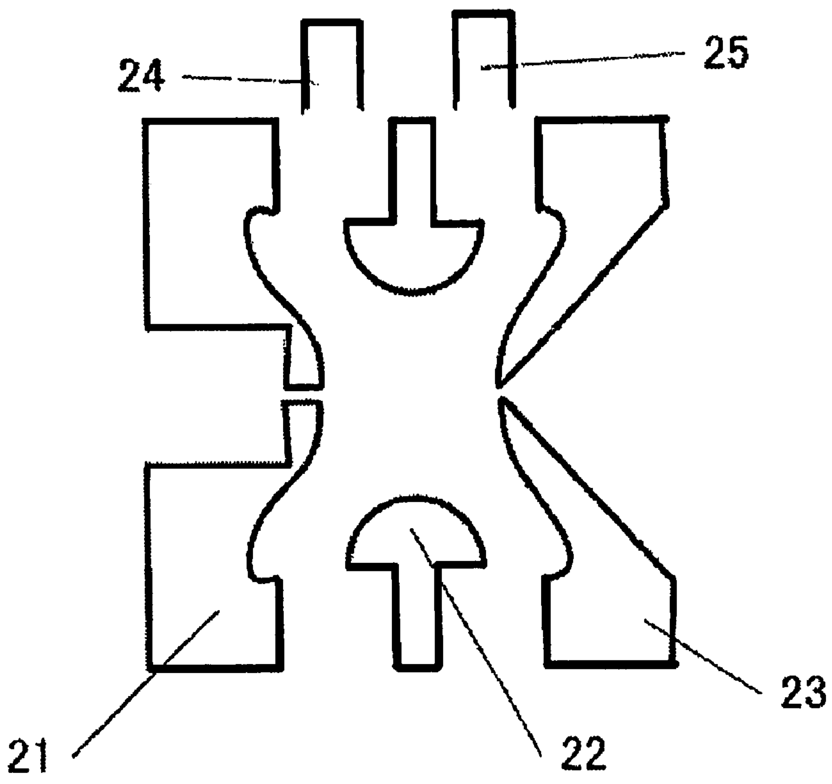
FIG. 2 is a structural diagram of an ion trap mass analysis portion.
Figure 3:
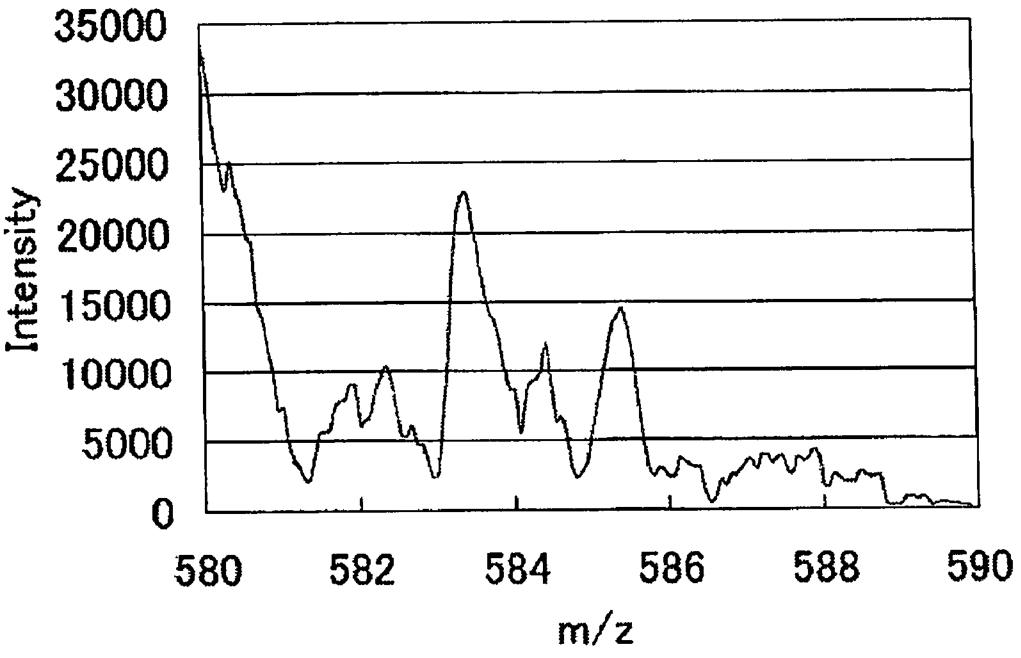
FIG. 3 is a graph illustrating a an example of an MS profile spectrum.
Figure 4A:
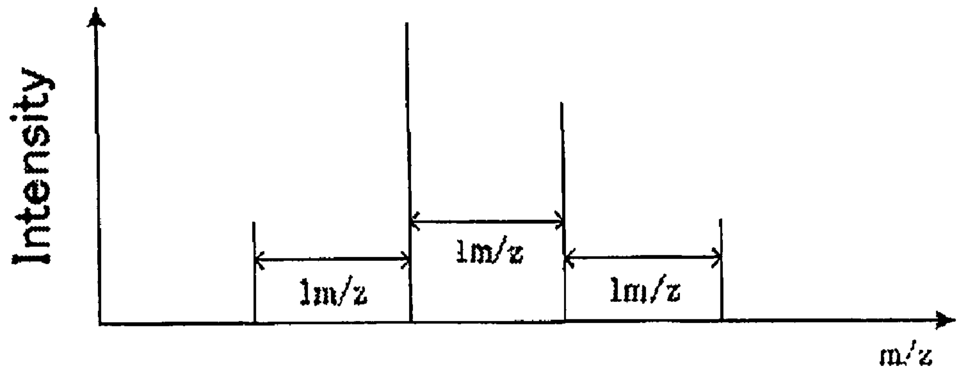
FIG. 4A illustrates an example of the MS profile spectrum in an APCI mode.
Figure 4B:
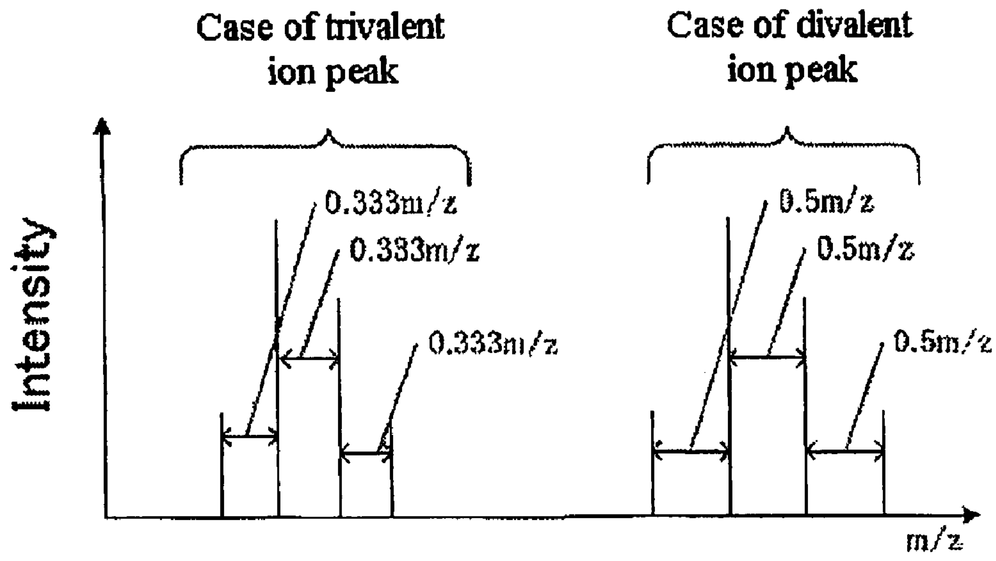
FIG. 4B illustrates an example of the MS profile spectrum in an ESI mode.
Figure 5:
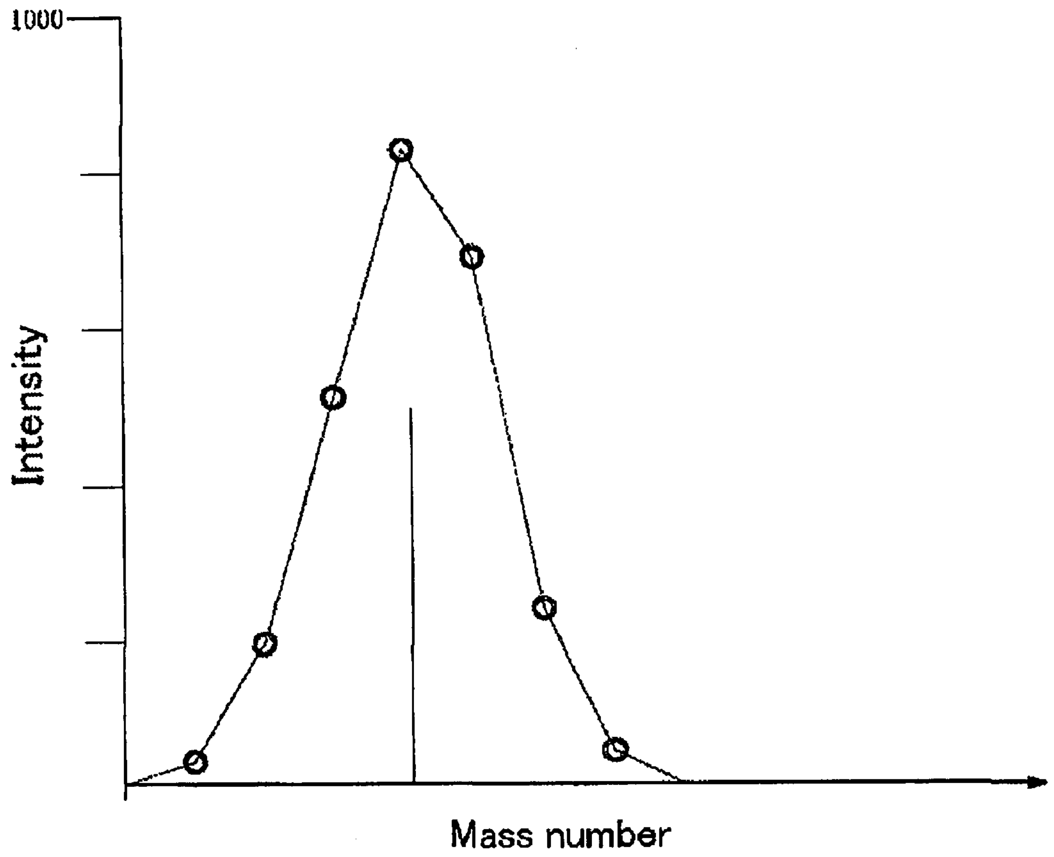
FIG. 5 illustrates the MS profile spectrum and the centroid spectrum.

Hereinafter, operation of the present invention in a case of performing MS/MS measurement using DDA will be described with reference to the drawings. FIG. 1 illustrates an entire configuration of an IT-TOF, and FIG. 2 illustrates an exemplary configuration of an ion trap portion 11. A chemical compound eluted from a column 4 of an LC is guided to an MS portion 5 via a flow path switching valve 18. The MS portion 5 includes an atomizing chamber 7 in which an ion spray portion 6 is provided, and an ion analysis chamber 10 in which the ion trap portion 11, an ion flight electrode 12, and an ion detecting unit 14 are provided, and two ion introducing chambers 9 are provided between the atomizing chamber 7 and the analysis chamber 10. The atomizing chamber 7 and an ion introducing chamber 15 in one stage are communicated with each other through a desolvating tube 8. A detection signal of the ion detecting unit 14 of the MS portion 5 is input to a signal processing portion 15, and is processed by the signal processing portion 15 as described later to be given to a parameter input/data display portion 17 as chromatogram data. The control unit 16 controls the operation in each part of the MS portion 5.

The operation of the MS portion 5 is as follows. When the chemical compound eluted from the column 4 reaches the ion spray portion 6, the compound is sprayed in the atomizing chamber 7 as liquid droplets charged with a high voltage applied to the ion spray portion. The flown liquid droplets strike gas molecules in the atmosphere, further are crushed into fine liquid droplets and dried rapidly (desolvated). As a result, molecules are vaporized. The gas fine particles effect an ion evaporation reaction to be ionized. The fine liquid droplets containing the generated ions jump into the desolvating tube 8, and desolvation further proceeds while the fine liquid droplets pass through the desolvating tube 8. The ions are sent to the ion analysis chamber 10 through the two ion introducing chambers 9. The ions are once accumulated in the ion trap portion 11 provided in the ion analysis chamber 10, and thereafter, are discharged to the ion flight electrode portion 12. In the ion analysis chamber 10, a voltage applied to electrodes constituting the ion trap portion 11 is changed. As a result, the MS measurement, MS/MS measurement, MS/MS/MS measurement, and the like can be conducted. During the MS measurement, first, in order to accumulate the ions in the ion trap portion, an inlet end cap electrode 21 is supplied with a potential of negative several V and an outlet end cap electrode 23 is supplied with a potential of positive several V (in a case where the ions are positive). As a result, the ions are confined. At a time when the ions enter the ion trap, a high frequency potential is applied to a ring electrode 22, and the confined ions are collected in a center portion of the ion trap electrode with gas introduced from a cooling gas introducing portion 24 and a high-frequency potential applied to the ring electrode 22 (referred to as cooling). After that, the high-frequency potential of the ring electrode 22 is turned off, and a potential of tens of KV is applied to the inlet end gap electrode 21 and a potential of the ion flight electrode portion 12 provided in the latter stage is applied to the outlet end cap electrode 23. As a result, the ions are discharged from the ion trap portion 11.

In the ion flight electrode portion 12, the ions fly in a drift space in accordance with the conservative law of energy with a voltage applied to the ion flight electrode portion 12. In the course of flight, the ions are pushed back again to the ion flight electrode portion 12 by a reflectron electrode 13 provided on an opposite side of the ion trap portion 11, and reach the ion detecting unit 14. Regarding the time required for the ions to reach the ion detecting unit 14, the ions with a smaller (lighter) m/z value reach the ion detecting unit 14 faster. Therefore, the time required for the ions to be discharged from the ion trap portion 11 and reach the ion detecting unit 14 is measured, the time information is converted into mass number information in a signal processing portion 15*a* of an operation portion 15, and a current in accordance with the number of ions having reached is taken out in the ion detecting unit 14.

Before an actual measurement operation is started, an apparatus is adjusted. For adjusting the apparatus, a standard sample filling a standard sample liquid tank 20 is used. The standard sample is a combination of a sample for calibrating a mass number (sample in which overlapping with an adjacent peak does not occur in a profile spectrum. For example, sodium acetate trifluoride) and a sample for obtaining a correction function (sample in which overlapping with an adjacent peak occurs in a profile spectrum, and a plurality of profile spectra having different degrees of overlapping can be measured. For example, myoglobin).

Figure 9:
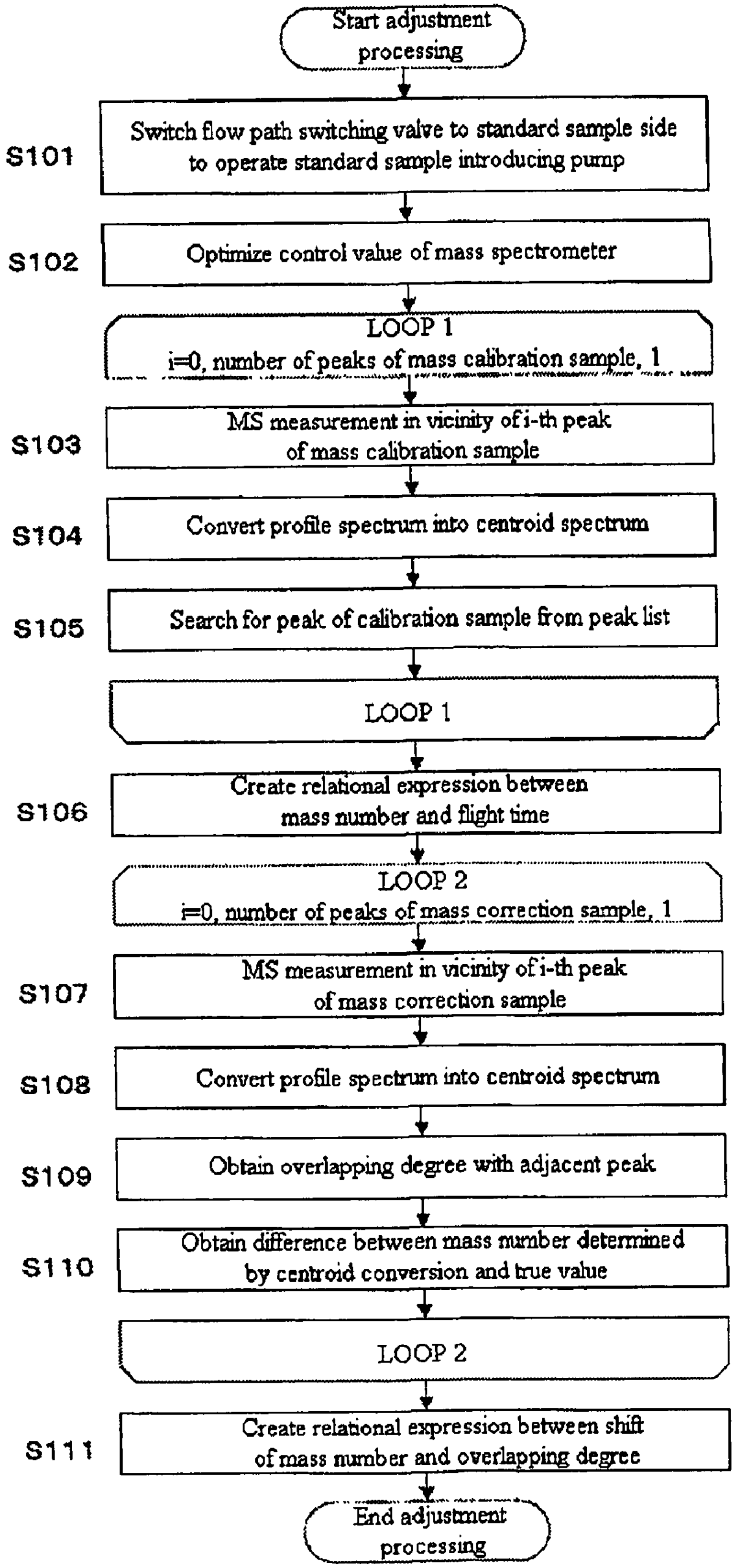
FIG. 9 illustrates a flowchart of apparatus adjustment processing.

The operation of adjusting a mass spectrometer will be described with reference to a flowchart shown in FIG. 9. After the flow path switching valve 18 is switched so as to feed a standard sample from the standard sample liquid tank 20 to the MS portion 5, a standard sample feed pump 19 is operated. As a result, the standard sample in the standard sample liquid tank 20 is introduced to the MS portion 5 (S101). In this state, the control values of each electrode of the ion introducing chamber 9 and the ion trap portion 11, and the reflectron electrode 13 are optimized so that the detection sensitivity becomes maximum in the MS portion 5 (S102). After that, the subsequent processes S103 to S105 are repeated by the number of peaks of a mass number calibration sample (mass number calibration processing).

An MS profile spectrum in the vicinity of the calibration mass number of the mass number calibration sample is measured (S103).

The determined MS profile is converted into a centroid spectrum in a conversion processing portion 15*b* (S104).

A peak corresponding to a calibration mass number is searched for from a list of peaks in the determined centroid spectrum, and the flight time of the peak is stored in a storage unit 26 (S105).

Due to the mass number calibration processing, Table 1 showing a relationship between the calibration mass number of the mass number calibration sample and the flight time is created, and a relationship between the known mass number and the measured flight time can be obtained.

TABLE 1

| Mass number | Flight time |
|---|---|
| 158.96458 | 22952.15891 |
| 566.88900 | 43262.79403 |
| 838.83862 | 52606.90998 |
| 1246.76305 | 64115.19855 |

Based on Table 1, a relational expression between a flight time and a mass number is created (S106).

$$\text{Flight time } (t)=g(\text{Square root of mass number } (m/z)) \tag{1}$$

In measurement, the flight time of the centroid peak is converted into a mass number, using an inverse function expression (2) of Expression (1).

$$\text{Square root of mass number } (m/z)=g'(\text{flight time } (t)) \tag{2}$$

Further, processes S107 to S110 are repeated by the number of peaks of the mass number correction sample contained in the standard sample (mass number correction processing).

An MS profile spectrum in the vicinity of the correction mass number of the mass number correction sample is conducted (S107).

The determined MS profile spectrum is subjected to the centroid conversion of a peak of a sample for creating a correction function, and the flight time of the centroid peak is converted into a mass number by Expression (2) (S108).

The degree of overlapping with respect to adjacent peaks is determined (S109).

$$\text{Overlapping degree of peak}=\text{Overlapping intensity}/\text{peak intensity} \quad (3)$$

The difference between the mass number of the determined centroid peak and the true mass number of the peak is determined (S110).

$$\text{Shift from true value}=\text{Mass number of centroid peak}-\text{True mass number of peak} \quad (4)$$

Figure 7:
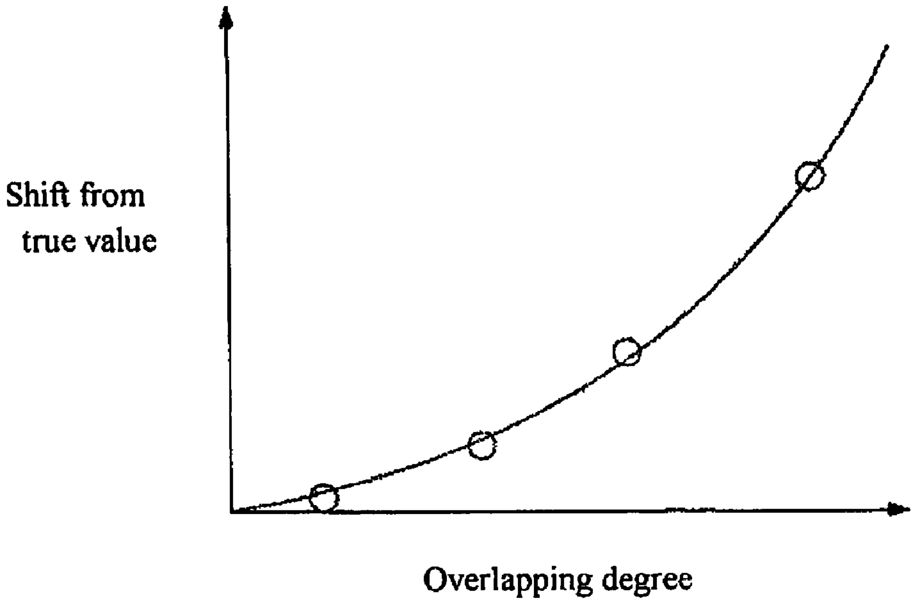
FIG. 7 illustrates s an example of a correlation obtained at a peak of a sample for creating a correction function.

The mass number correction processing is conducted by the number of peaks of the sample for creating a correction function. As a result, the figure as shown in FIG. 7 is obtained. This shows that the relation between the overlapping degree and the shift from a true value is substantially a quadric function. Herein, if the overlapping degree is 0, there is no shift from the true value of a centroid peak, and the value of the shift becomes 0.

Figure 6A:
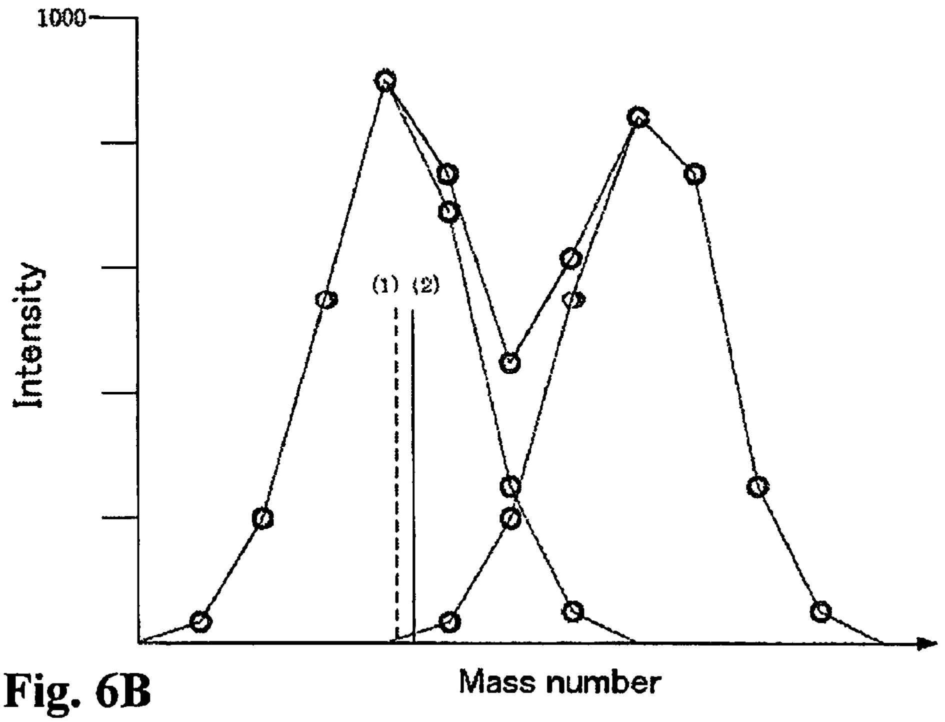
FIGS. 6A and 6B are graphs each illustrating respective parameters for creating a correction function of correcting a shift of the centroid spectrum.
Figure 6B:
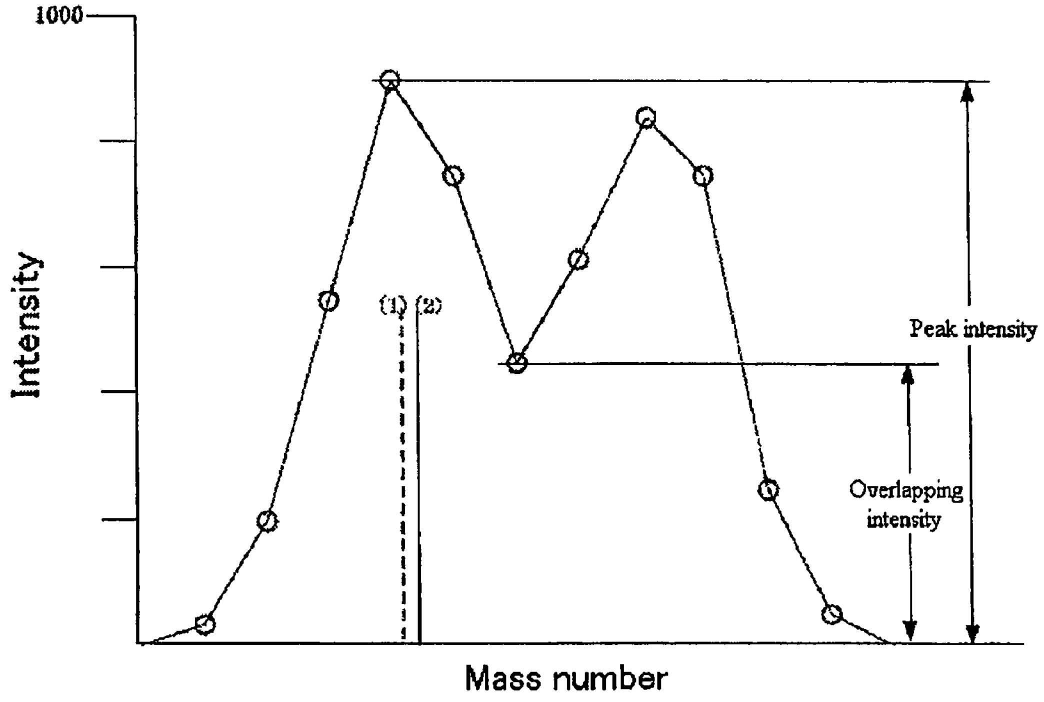

A correlation function (Expression 5) between the overlapping degree of peaks and the shift from a true value is created. MS measurement processing is conducted using a sample with a known mass number in which peaks of a profile spectrum overlap each other as shown in FIG. 6B. As a result, the difference between the true mass number and the mass number of a centroid spectrum, and the overlapping degree at that time (ratio between the intensity of a portion to be a valley in a profile spectrum and the intensity of a peak top) are determined. Regarding a plurality of peaks having different overlapping degrees, the data thereof are measured, and a correction function (5) is created using a plurality of pieces of information [overlapping degree and shift of a mass number) (S111).

$$\text{Shift of mass number}=f(\text{Overlapping degree}) \quad (5)$$

As the overlapping degree of a target peak, the overlapping degree in a rising portion of a peak and the overlapping degree in a falling portion of the peak are determined simultaneously, and finally, Expression (6) for correcting the centroid peak position of each peak is created, and stored in the storage unit 26.

$$\text{Centroid peak position}=\text{Centroid peak position as in conventional example}+f(\text{Overlapping degree in a rising portion})-f(\text{Overlapping degree in a falling portion}) \quad (6)$$

Herein, the overlapping degree in a rising portion is corrected in a +(plus) direction, and the overlapping degree in a falling portion is corrected in a −(minus) direction. Therefore, even in a case of expressing a correction function by a third or more order function, the correction function does not take a negative value.

Figure 10:
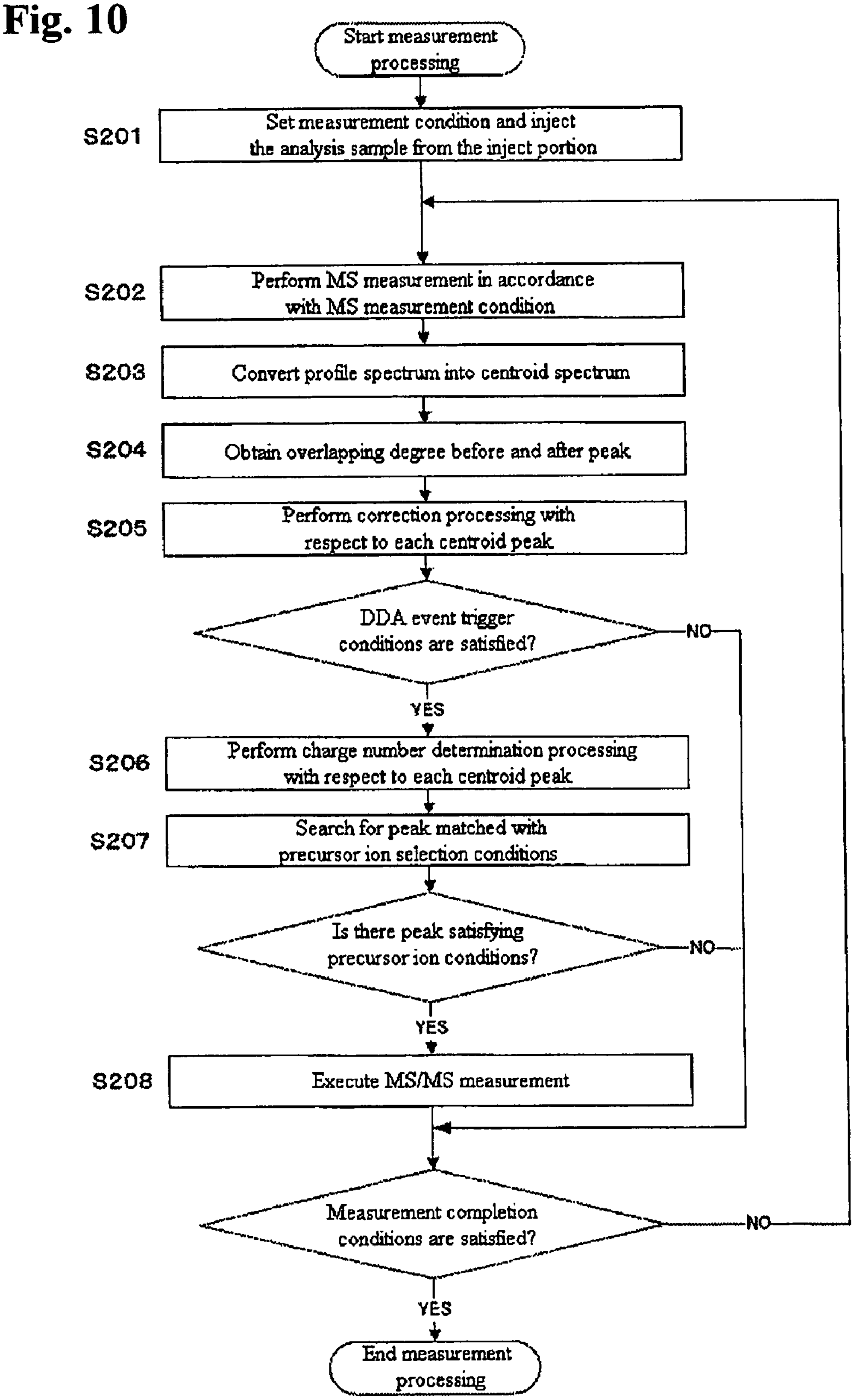
FIG. 10 illustrates a flowchart of measurement processing.

Thus, the adjustment processing of the apparatus is completed. Next, an actual measurement operation is conducted. The actual measurement operation will be described with reference to the flowchart shown in FIG. 10. For an actual measurement, measurement completion conditions, a measurement mass range in an MS spectrum measurement (hereinafter, referred to as "MS measurement conditions"), precursor ion selection conditions for measuring an MS/MS spectrum, and measurement conditions of the MS/MS spectrum measurement mass range (referred to as "DDA conditions") are created by the parameter input/data display portion 17. The created MS measurement condition and DDA condition are stored in the storage unit.

Figure 8:
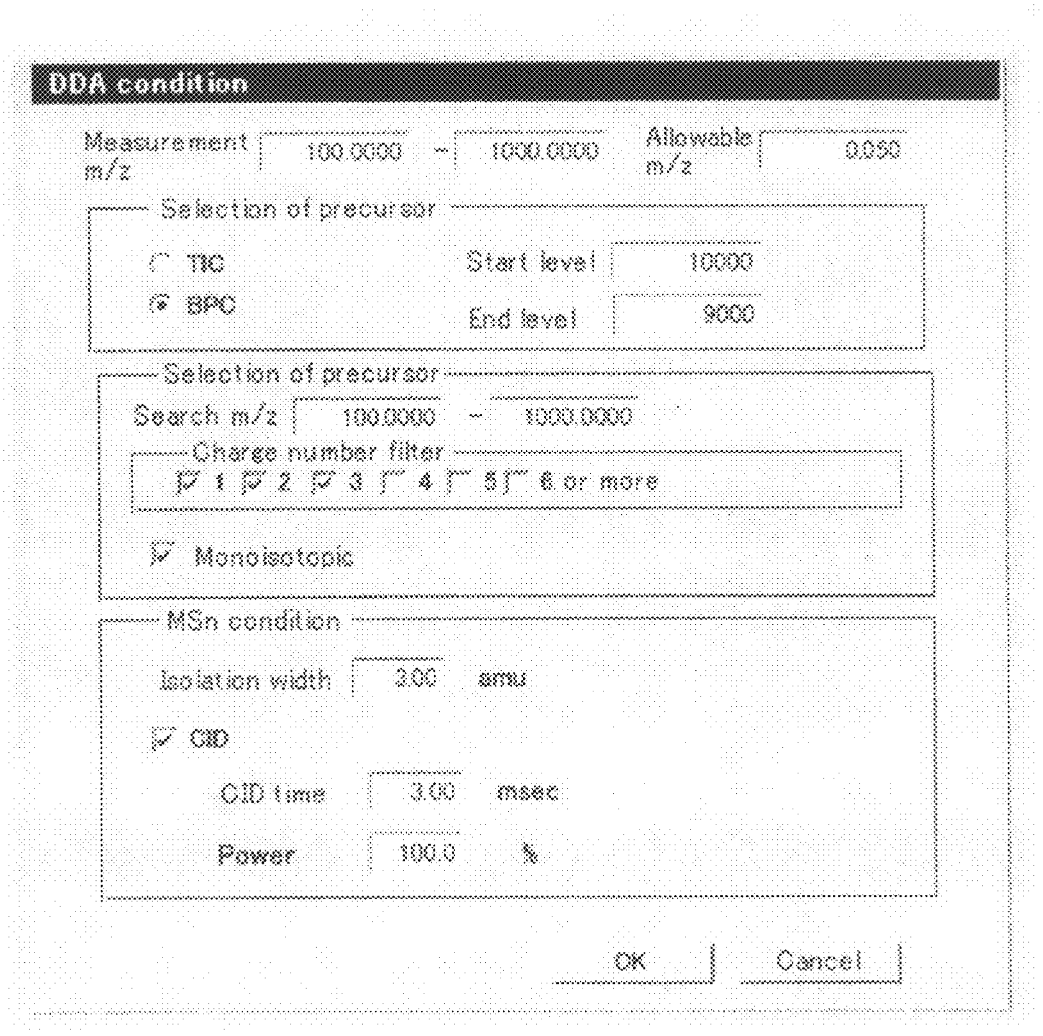
FIG. 8 illustrates an example of a DDA condition setting screen.

FIG. 8 illustrates a screen of setting MS measurement conditions and DDA conditions. The m/z range of the MS measurement mass number is set to be 100.0000-1000.0000, and a tolerance value is set to be 0.050 regarding the determined m/z value. The conditions are as follows: an event execution trigger performs an MS/MS measurement when ions matched with the DDA conditions are found by the MS measurement in either mode of a total ion chromatogram (TIC) and a base peak chromatogram (BPC) during a period from a time when the signal intensity exceeds 10000 after the peak commencement of a chromatogram to a time when the signal intensity becomes less than 9000 before the peak completion, i.e., in a time band during which a component is separated in a time direction in the liquid chromatograph portion and eluted in a concentration to some degree. While the conditions are not satisfied, the MS/MS measurement is not conducted. The selection of a precursor ion is an item for performing an MS measurement and setting the n/z range of a precursor ion for performing an MS/MS measurement. A charge number filter appropriately sets which valence of ions are calculated in accordance with the kind of ionization and an object to be measured. In the monoisotopic item, it is determined whether or not only a monoisotopic mass is only targeted. The MSn conditions are used for setting the conditions for selecting only ions with a particular mass number and cleaving the selected ions.

Measurement processing is started from a time when the mixture of the compounds is introduced from the injection portion 3 (S201). Measurement execution means first performs the first MS spectrum measurement in accordance with the MS measurement conditions (S202). Then, for the MS/MS spectrum measurement, the determined MS profile spectrum is converted into a centroid spectrum (S203), and the overlapping degree is determined in rising and falling portions of a peak (S204). Then, using the correction function (Expression (6)) determined by the previous adjustment processing, the position correction processing of the centroid peak is performed in the correction processing portion 15*c*, and the determined results are set to be the mass number of a target peak (S205).

When the centroid conversion processing is completed over the entire region of the MS profile spectrum determined by the first MS measurement, a determination processing portion 15*d* determines whether or not the event trigger conditions of the DDA conditions in which the centroid spectrum determined by the conversion processing is set are satisfied with reference to the conditions stored in the storage unit 26. As the result of the determination, when the conditions are not satisfied, the measurement of an MS spectrum (S202) to the position correction processing (S205) of the centroid peak are repeated without performing the MS/MS measurement.

In a case where the event trigger conditions are satisfied, in order to search for the peak specified under the DDA conditions, charge number determination processing of the determined centroid peak is performed (S206). Although there are various methods for the charge number determination processing, the processing by any method may be conducted. The peaks on the centroid data are specified successively as standard peaks for identifying isotopes in a decreasing order of intensity, and emerging patterns of peaks arranged before and after the standard peak are compared with an emerging pattern of an isotope cluster predicted in a case where each charge number is assumed to perform processing of detecting an isotope cluster (invention of JP 2005-141845) As a result, charge number determination processing can be performed at a high speed.

A precursor ion matched with the precursor ion selection conditions is searched for with a centroid spectrum subjected to charge number determination processing (S207). In a case where the precursor ion matched with the conditions is found, an MS/MS spectrum measurement is performed. In a case where a precursor ion matched with the conditions is not found, the MS spectrum measurement is conducted again (S202) without conducting the MS/MS measurement. Such measurement processing is repeated until the measurement completion conditions are matched.

Due to the measurement operation, the LC/MS/MS measurement can be performed regarding a intended precursor ion, and a corrected true value can be determined regarding the mass number of the determined centroid spectrum.

Thus, the present invention has been described by way of an example of the liquid chromatograph mass spectrometer. However, the present invention is also applicable to the correction of a centroid peak position in the processing in which another separation apparatus is connected to a mass spectrometer. The above-mentioned example is merely an example of the present invention, and it is apparent that modifications or alterations are included in the present invention in the scope of the spirit of the present invention.

What is claimed is:

1. A chromatograph mass spectrometer, comprising:

analysis execution means for obtaining a profile spectrum in a mass range based on a setting condition by one mass scanning;

conversion means for converting the profile spectrum into a centroid spectrum;

precursor ion selection means for setting an ion of a peak of the centroid spectrum matched with the setting condition to be a precursor ion;

means for, in a mass spectrometer that performs mass scanning by the analysis execution means regarding the precursor ion, measuring a known calibrate sample in which overlapping between a compound with a known mass number and an adjacent peak occurs and which has a plurality of peaks having different overlapping degrees, and creating a correction function from a relationship between an overlapping degree with respect to the plurality of peaks and a shift of the mass number; and correction means for correcting the centroid peak with the correction function when the profile spectrum is converted into the centroid spectrum.

2. A chromatograph mass analysis method, comprising:

executing analysis of obtaining a profile spectrum in a mass range based on a setting condition by one mass scanning;

converting the profile spectrum into a centroid spectrum;

selecting an ion of a peak of the centroid spectrum matched with the setting condition as a precursor ion; and performing mass scanning with the analysis execution means regarding the precursor ion, wherein a known calibrate sample in which overlapping between a compound with a known mass number and an adjacent peak occurs and which has a plurality of peaks having different overlapping degrees, a correction function is created from a relationship between an overlapping degree with respect to the plurality of peaks and a shift of a mass number, and the centroid peak is corrected with the correction function when the profile spectrum is converted into the centroid spectrum.

* * * * *